July 26, 1960 C. K. STEDMAN 2,946,225
ANGULAR ACCELEROMETER
Filed April 12, 1956 7 Sheets-Sheet 1

INVENTOR.
CECIL K. STEDMAN
BY
ATTORNEY.

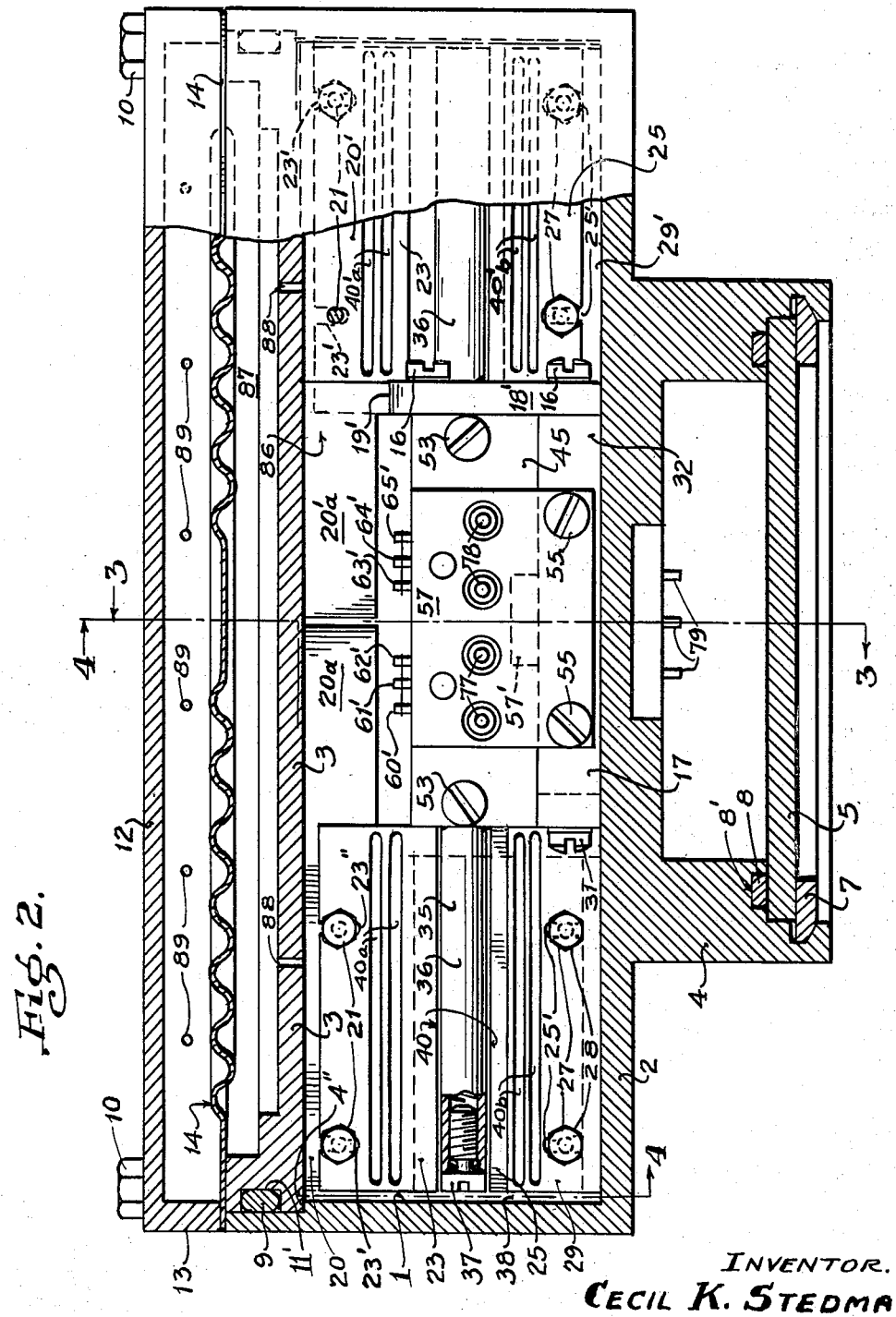

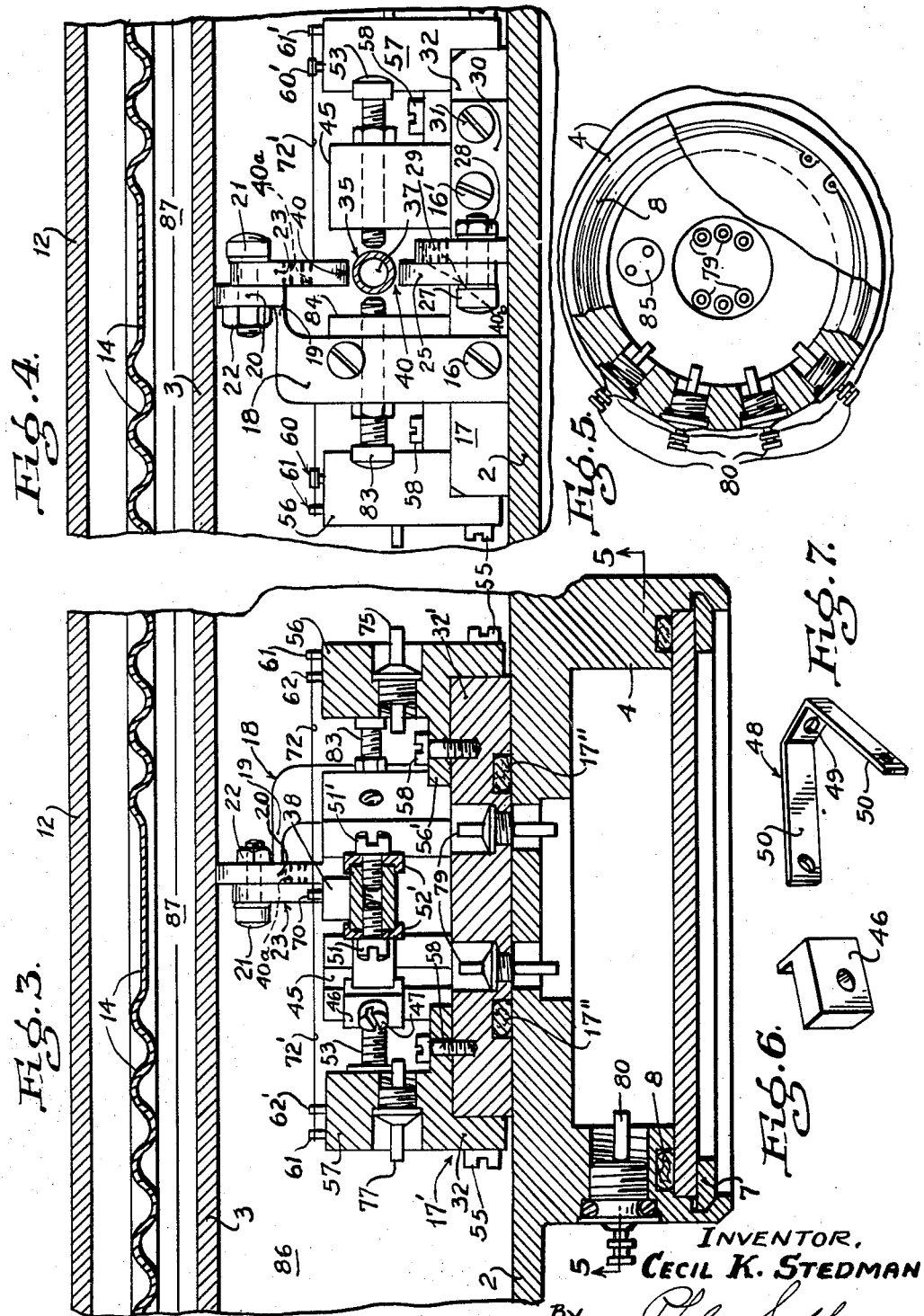

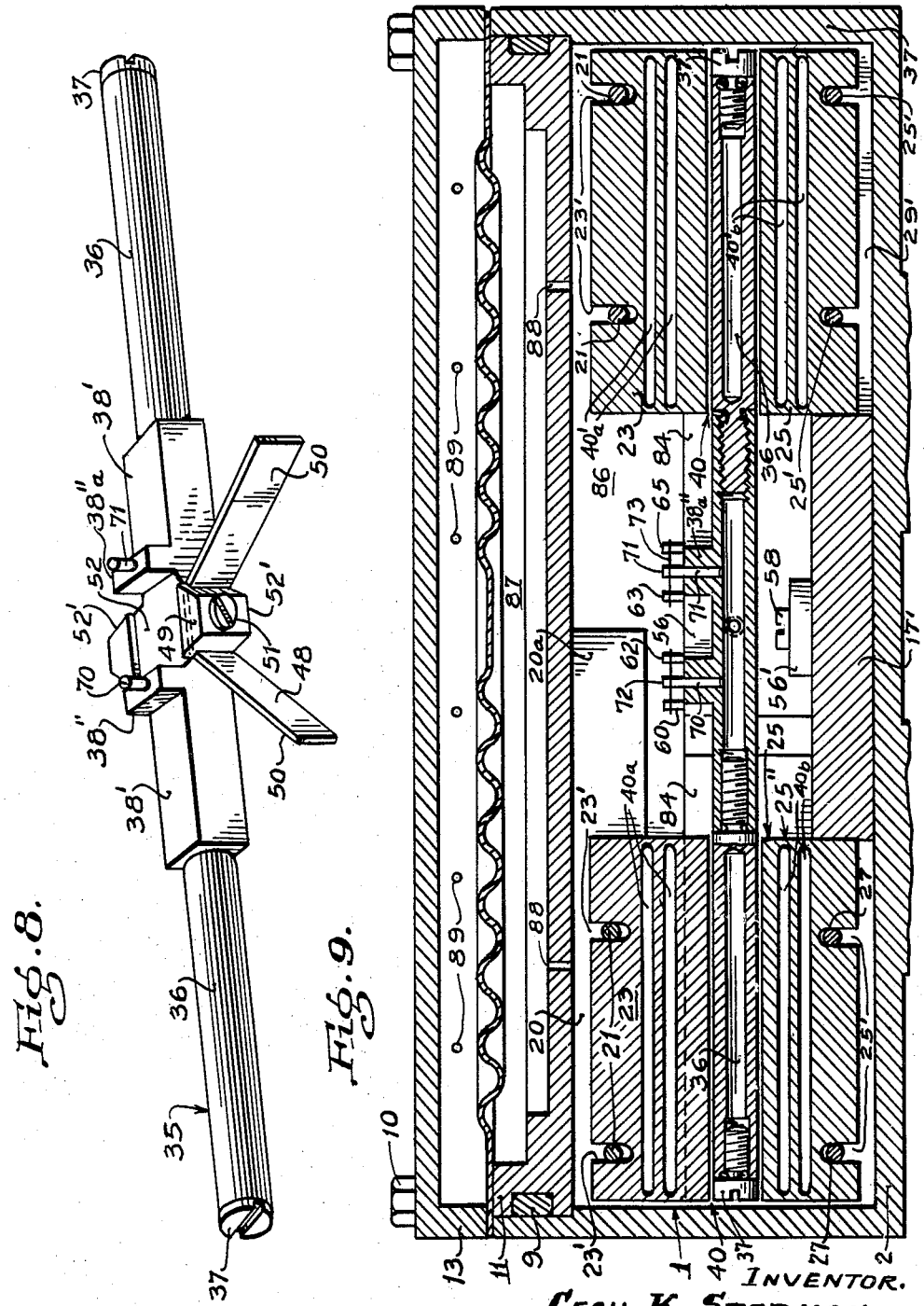

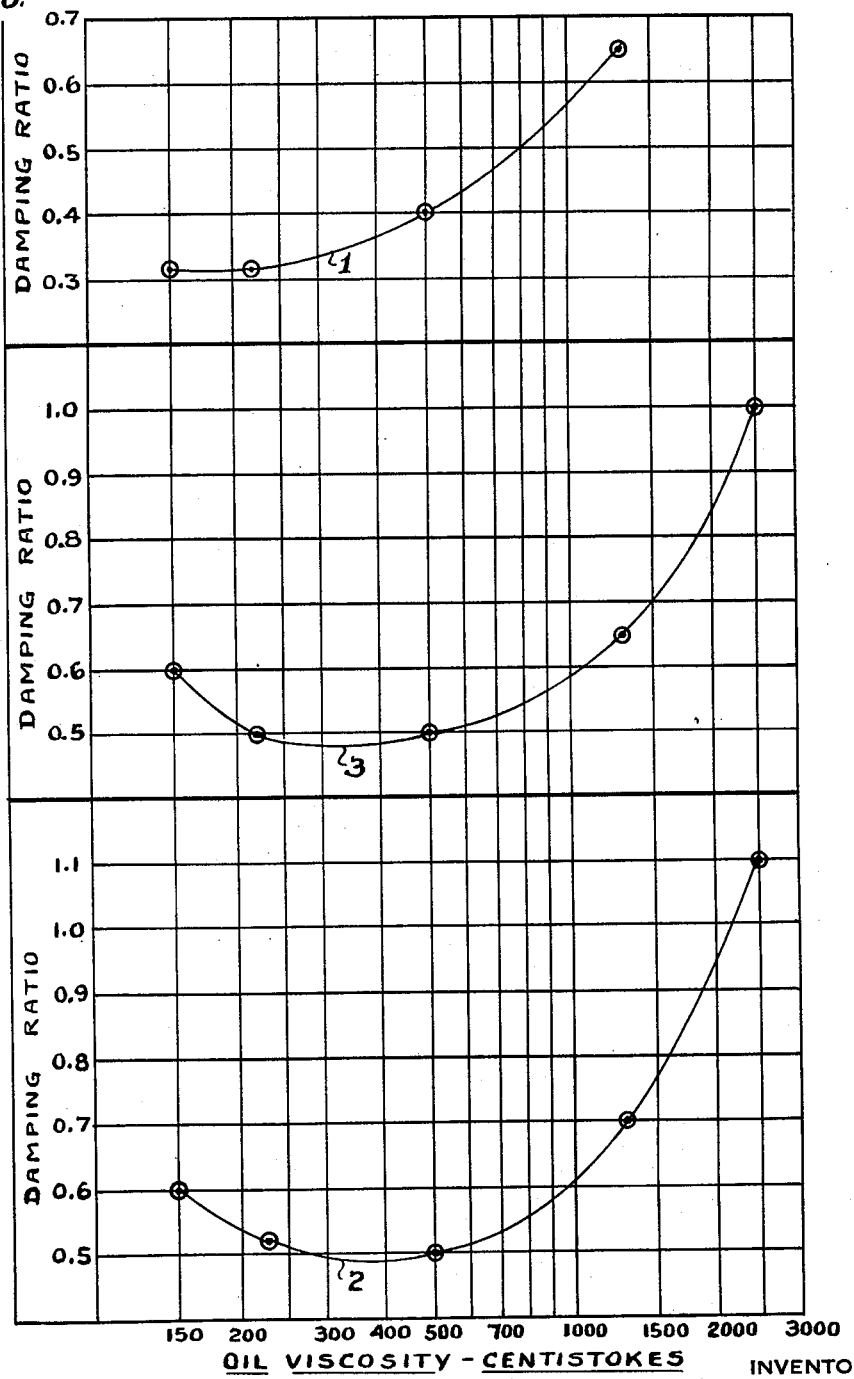

July 26, 1960  C. K. STEDMAN  2,946,225
ANGULAR ACCELEROMETER
Filed April 12, 1956  7 Sheets-Sheet 6

INVENTOR.
CECIL K. STEDMAN
BY
ATTORNEY.

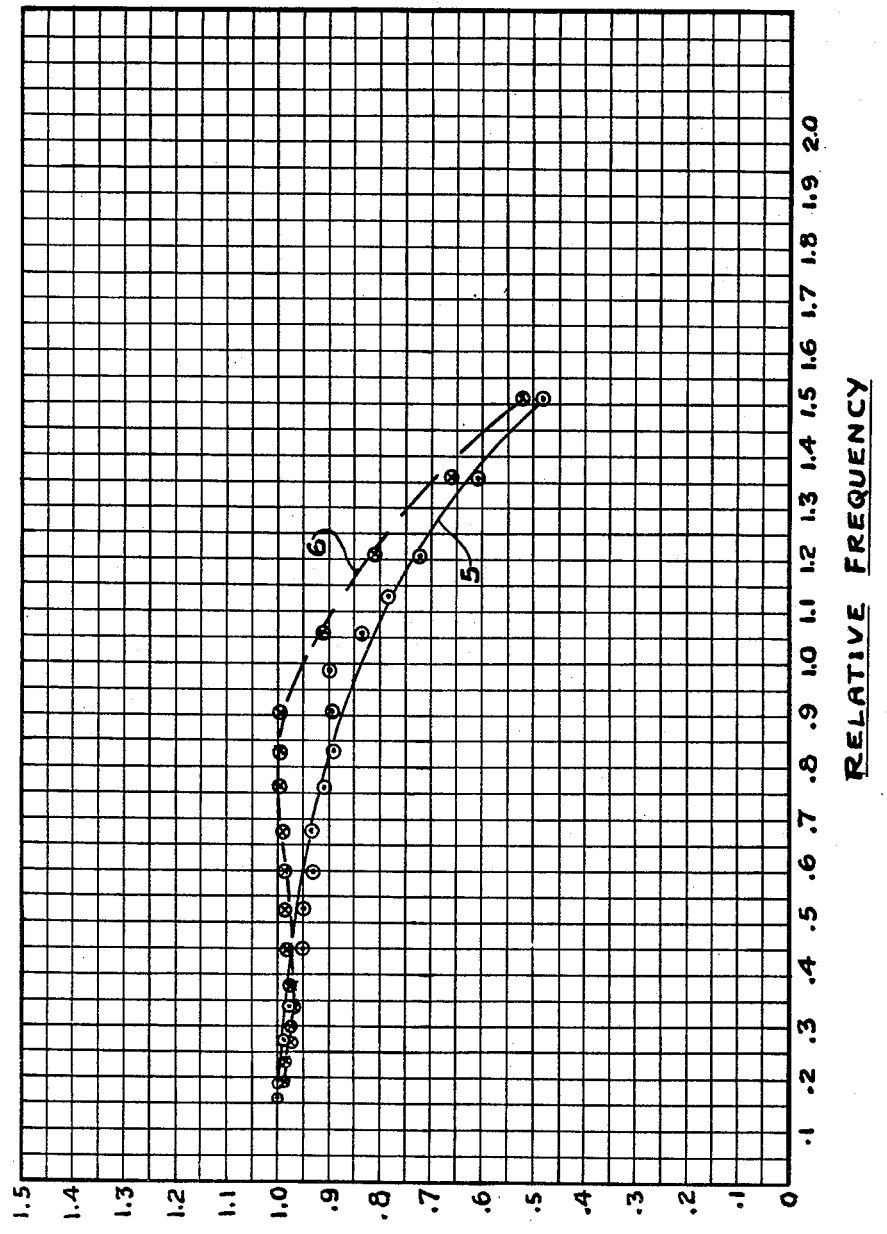

United States Patent Office 2,946,225
Patented July 26, 1960

2,946,225
ANGULAR ACCELEROMETER
Cecil K. Stedman, Enumclaw, Wash., assignor to Statham Instruments, Inc., Los Angeles, Calif., a corporation of California Filed Apr. 12, 1956, Ser. No. 577,707

8 Claims. (Cl. 73—516)

This invention relates to a motion responsive device for indicating and recording the magnitude and nature of motions of an object in space. It belongs to the general class of motion sensing devices such as accelerometers.

The conventional examples of such systems include devices in which the effective inertial mass is a solid mass suspended on springs and the nature and magnitude of the displacement of the mass on the springs are a measure of the magnitude and nature of the motion.

Instead of using a solid mass suspended on springs, as in the prior art, I employ a liquid mass as the effective inertial mass and measure the acceleration of the liquid mass in the container subjected to the motion to be sensed.

In applications of Louis D. Statham, Serial No. 241,539, filed August 13, 1951, now Patent No. 2,778,905, and Serial No. 328,416, filed December 29, 1952, now Patent No. 2,778,623, and Patent No. 2,778,624, are disclosed such devices where liquid mass is used instead of a solid inertial mass, and thus one may use a large mass without introducing a large hinge, such as would be necessary were one to use a solid mass of equivalent weight. Such a large weight would require a large hinge or pivots or springs in order to withstand mechanical shocks. Because, as stated above, one uses as the effective inertial mass, a liquid mass, and does not employ a solid mass as the effective inertial mass, one may avoid the use of hinges and pivots of the size necessary where the effective inertial mass is solid rather than liquid.

By placing a movable member immersed in the liquid and mounted for motion relative to the liquid in the container, the relative motion of the liquid and the container wall will cause the movable member to be displaced, as a result of a difference in pressure on both sides of the movable member. By mounting the member so that it is movable relative to the container body, the acceleration of the liquid will produce a thrust on the movable member.

The motion of the liquid is damped by viscous drag. In order to increase the damping effect, there is added an additional damping means, by causing the fluid to flow through an orifice. The result of this arrangement not only gives an additional damping effect but has the property that it tends to maintain a more nearly constant damping coefficient for the instrument, notwithstanding temperature changes and consequent changes in viscosity of the liquid, than would be obtained if the orifice were not employed.

In the instant invention the liquid mass serves as the rotor so that the weight of the paddle which must be supported along the sensitive axis can be made extremely low. Baffles are fixedly mounted above and below the paddle, such baffles being disposed parallel to the axis of the paddle and spaced closely adjacent thereto. Thus, the separation between the edges of the paddle and the inner chamber walls form fluid communication passageways, and the spaces between the baffles and paddles form other fluid communicating passages. When the instrument is subjected to an angular acceleration, the inertial forces will cause the liquid to circulate and develop a pressure against the paddle. The paddle will deflect angularly until the elastic restraint of the flexure and the pickoff (mechanism for sensing the motion) balances the forces on the paddle. The novel structure of the invention can be readily adapted to the use of a variety of pickoff mechanisms.

It is not necessary for the paddle to have any substantial mass; all that is required is that it be structurally rigid. Preferably and ideally, the weight of the paddle in air may be made equal to the weight of the liquid displaced by the paddle when it is mounted in the device where it is immersed in the liquid forming the effective inertial mass. Such a paddle may be termed buoyant. Accordingly, the paddle is preferably constructed as a hollow member with sealed ends so that its weight, when immersed in the liquid, is relatively small, and ideally may be made substantially equal to zero. The buoyancy reduces the weight of the paddle in liquid. The use of a buoyant paddle also eliminates the necessity for careful balance of the suspended mass to minimize the sensitivity of the instrument to linear accelerations. It also reduces the effect of angular velocity on the displacement of the paddle, and if the paddle has an insubstantial submerged mass, the paddle may be made insensitive to linear velocity.

The paddles and baffles separate the chamber into a plurality of subchambers which are in fluid communication with each other through the orifices formed by the spaces between the paddle and the baffle edges and between the paddle ends and the chamber wall. On clockwise angular acceleration of the chamber a counter-clockwise circulation occurs in each of the subchambers, the liquid flowing in opposite directions on the two sides of the baffle. A circulation also occurs through the orifices on one side of the chamber and in the opposite direction on the other side of the chamber, i.e., through the paddle orifices between the paddle and baffles and between the paddle ends and the chamber wall. The flow through the gaps may thus be defined as in parallel with the flow in each subchamber.

It has been previously observed that the damping ratio or coefficient in such a structure in which the inertial fluid is a liquid whose viscosity changes with temperature, also varies with the temperature.

The damping characteristics of such instruments are such that as the viscosity of the inertial liquid decreases, the damping ratio decreases, passes through a minimum, and then again increases, as the viscosity decreases. This minimum usually extends over a range of viscosity wherein the value of the damping ratio changes but in an unappreciable amount. For convenience, this damping ratio may be termed the minimum damping ratio, and the viscosity, or viscosity at the minimum value of the damping ratio, the minimum viscosity.

It has been observed that for any given instrument design the value of the minimum damping ratio depends on the resistance to flow of the liquid in the orifices and also on resistance to flow in the subchambers, and is approximately equal to the following ratio:

$$\frac{1}{\sqrt{r/R+1}} \qquad (Eq. 1)$$

where $r$ is the resistance to flow through the paddle gaps, and $R$ is the resistance to flow in the subchambers.

In any given instrument of the above design, filled with any given liquid, the value of the minimum damping ratio and the temperature at which this minimum occurs will depend, all other things being held constant, on the resistance to flow in the gaps, the damping ratio increasing with decrease in this resistance. It has been observed that all other design parameters being constant, a widening of the gap increases the value of the minimum damping ratio, while on the other hand, a narrowing of the gap results in a reduction in the value of the minimum damping ratio and a reduction in the damping ratio at all temperatures. Thus, by selecting the oil of proper viscosity and adjusting the width of the gaps, it is possible to obtain a desired value of the minimum damping ratio and cause this to occur at the desired temperature. Due to the fact that the viscosity of the oil changes with temperature, the damping ratio will increase beyond the minimum as the temperatures are increased or decreased from those at which the minimum damping ratio is obtained. It has been the practice to select the oil and use a sufficiently wide gap in any given instrument design, so that over the range of temperatures at which the accelerometer is expected to operate that the average value of the damping ratios obtained will be in the region of .7, and this is obtained by selecting the design parameters such that the minimum damping ratio occurs at room temperature and has a value of about .5 to .6.

However, when the gap is made sufficiently wide to obtain the desired minimum damping ratio, the frequency response of the instrument may deteriorate. That is, if the instrument is subjected to a constant acceleration at various frequencies, the relative amplitude of displacement of the paddle (i.e., the ratio of displacement at the applied frequency to the displacement of the paddle when the constant acceleration is applied at zero frequency) decreases with rising frequency much more rapidly than in an ideal instrument having constant mass, stiffness and damping. In some cases it first diminishes and then rises to a resonance peak as the frequency increases. This phenomenon is termed "droop" and is an objectionable characteristic for accelerometers and other types of transducers. The desirable characteristic is to obtain a minimum variation in relative response at frequencies to at least 0.4 of the natural frequency.

This phenomenon of droop results substantially from inertia of the liquid flowing through the gap and also from the fact that in instruments of the design herein described the resistance to flow resulting from viscous drag of the liquid in the chamber, in which the liquid circulates, is substantially constant up to a given frequency and increases with frequency beyond this point and the frequency at which this change occurs is the higher, the higher the viscosity.

I have discovered that so long as the width of any gaps or orifice through which the parallel flow occurs is less than a critical upper value, the droop due to the inertial effect of flow through the gap or orifice may be lessened and even substantially removed. The requirement can be expressed in the form $$d^2 < \frac{1}{2}\frac{k}{f_n} \quad \text{(Eq. 2)}$$

where $f_n$ is the natural frequency of the instrument in cycles per second, i.e., the motion sensing device including the liquid mass, in cycles per second, $d$ is the width of any gap in centimeters and $k$ is the kinematic viscosity in stokes of the liquid at the temperature at which $f_n$ is taken. This will remove a substantial portion of the droop in instruments of whatever natural frequency although at some frequencies the droop due to viscosity drag may still be present. In instruments whose natural frequency is substantially equal to or less than the frequency at which the resistance due to viscous drag increases with frequency, as stated above the adjustment of the gap will remove substantially all of the droop.

I have discovered that an instrument having gaps, which have the required width and length and are of sufficient number to give the value $r$ (Eq. 1) to supply the damping ratio, will give a frequency response curve which will exhibit droop if the value of the width of the gap ($d$) of any of the gaps, measured in a direction perpendicular to the flow through said gap, exceeds the above critical limits. In such case I may substantially eliminate the droop by narrowing all gaps to less than the above critical limit and increase their number or their length to increase the total area of the gaps and thus reduce the value "$r$" to that found desirable to obtain the above damping ratio or any other damping ratio found desirable.

Thus, if the width of the single gap that would be required to achieve the desired damping exceeds this critical limit, droop due to gaps can still be substantially eliminated by adding additional auxiliary gaps or slots. Each individual slot is narrow enough to satisfy (Eq. 2) and a sufficient number is provided so that the aggregate flow resistance "$r$" of their combined parallel paths is sufficiently low to give the desired damping in accordance with Eq. 1. Thus, with $h$ (the minimum damping ratio) approximately equal to $$\frac{1}{\sqrt{r/R+1}}$$

and with $$d^2 < \frac{1}{2}\frac{k}{f_n}$$

it is possible to determine the number and size of these auxiliary orifices to obtain the desired minimum damping ratio with an improved frequency response curve as compared to systems in which such auxiliary orifices are not employed. The ratio $$\sqrt{\frac{k}{2f_n}}$$

gives the maximum value of $d$ which will give a substantial removal of the contribution of the inertia of the fluid in the gap to the droop. As the gap is made still smaller this contribution is more perfectly removed, however, there is a practical lower limit to the size of gap which is dictated by the number of such slots which may be provided in the available space.

These and other features and objects of my invention will be further described in connection with the accompanying drawings, wherein:

Fig. 2 is a vertical broken section taken on line 2—2 of Fig. 1;

Fig. 3 is a vertical section on line 3—3 of Fig. 2;

Fig. 4 is an irregular section on line 4—4 of Fig. 2;

Fig. 5 is a view taken on line 5—5 of Fig. 3, looking in the direction of the arrows;

Fig. 6 is a perspective view of an element on the invention device;

Fig. 7 is a perspective view of another element of the device;

Fig. 8 is an isometric view of the paddle assembly of the device; and

Fig. 9 is a section taken on line 9—9 of Fig. 1.

Figs. 10, 11 and 12 are charts showing the damping and response characteristics of instruments and illustrating my invention.

Figure 1:
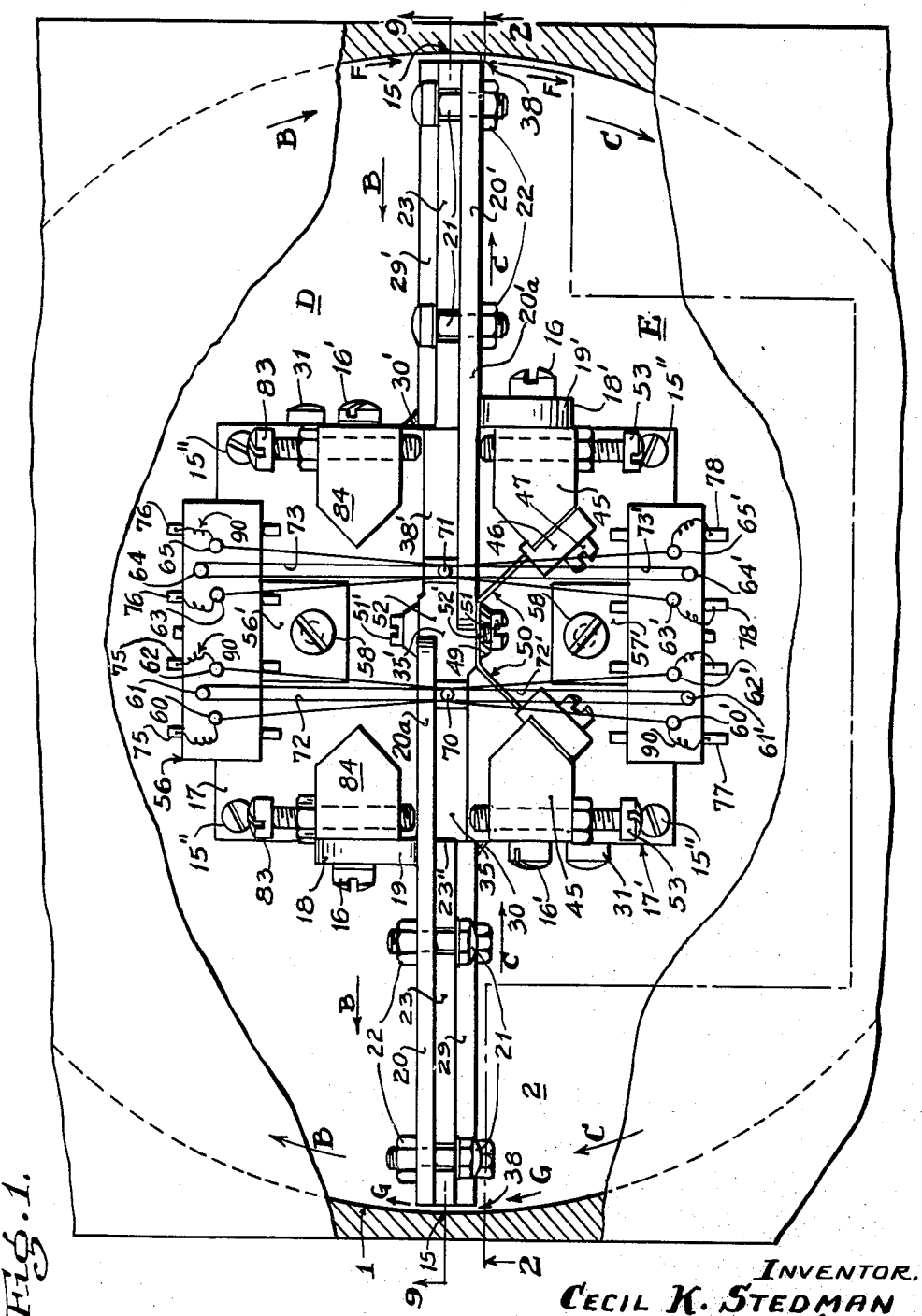
Fig. 1 is a plan view of a preferred embodiment of my invention, with parts broken away and parts in section for clarity.

Referring particularly to Figs. 1 and 2, the container 1 is shown as a cylinder, but may be of any shape provided that it is a closed container. The container is closed by a bottom 2 and a top 3. The bottom 2 carries a depending circular flange 4, to the lower end of which is secured a removable cover 5, held in place by snap ring 7 maintained in a suitable groove in flange 4. An O-ring 8 is positioned in a groove 8' located in a horizontal shoulder intermediate the sides of flange 4. The top 3 is held in position on the upper wall of the case 1, with the lower end portion of member 3 resting on a horizontal shoulder 4″ formed by a recess in the wall. Secured to top 3 by means of bolts 10 passing through an outer upwardly extending flange 11 of the top 3, is a cover 12 having a depending flange 13. Positioned between the lower end of flange 13 and the top of flange 11 is a flexible diaphragm 14, held in place by the bolts 10. Flange 11 has an annular recess 11′ therein to accommodate an O-ring 9 for sealing purposes.

As seen in Figs. 1, 2 and 4, a square bracket member 17′ comprising half bracket portions 17 and 32 is attached to the base 2 by means of screws 15″ located at the corners of member 17′.

An O-ring seal 17″ (see Fig. 3) is disposed in an annular groove in the lower surface of member 17′ in contact with the bottom 2. Secured by means of bolts 16 to opposite sides of bracket portions 17 and 32, respectively, is a pair of supports 18 and 18′, each having a horizontally extending upper portion 19 and 19′. Upwardly extending plates 20 and 20′ are integrally secured to the ends of each of portions 19 and 19′ of supports 18 and 18′, each of such plates extending substantially into contact with top 3 and extending outwardly across the container, the outer edges of the plates 20 and 20′ being spaced a short distance from the adjacent container wall sections 15 and 15′.

As is seen in Fig. 2, plates 20 and 20′ extend inwardly almost to the center of the container, their inner edges being located closely adjacent each other and their inner portions 20a and 20′a being reduced in size to accommodate the strain wire transducer structure as shown in Fig. 9 and described below. Secured to each of plates 20 and 20′ by bolts 21 and nuts 22 is a baffle 23, the lower ends of which extend somewhat below the lower ends of plates 20 and 20′. Bolts 21 pass through slots 23′ in baffles 23, the slots being provided for vertical adjustment of the baffles to vary the distance between the lower edges of the baffles and the paddle 35 described below. Baffles 23 extend in alignment with each other along a diameter of the container 1 and their outer ends are located adjacent the respective opposite ends of plates 20 and 20′, the outer edges of the baffles and plates 20 and 20′ being spaced a short distance from the adjacent container walls. The inner edges 23″ of baffles 23 are located directly above the opposite side edges of bracket member 17′.

A pair of lower baffles 25 of approximately the same length as baffles 23 are positioned directly below and in alignment with the upper baffles 23, the upper longitudinal edges of baffles 25 being spaced from and parallel to the adjacent lower longitudinal edges of baffles 23. The outer edges of baffles 25 are also spaced a short distance from the container wall sections 15 and 15′, although if desired, the outer edges of either or both baffles 23 and 25, or of either or both plates 20 and 20′ may touch the adjacent wall sections. The inner ends 25″ of baffles 25 abut against opposite sides of bracket member 17′ (see Fig. 9). Baffles 25 are secured by means of bolts 27 and nuts 28 to plates 29 and 29′ located at opposite sides of container 1 and in vertical alignment with plates 20′ and 20, respectively. Bolts 27 pass through slots 25′ in baffles 25 for vertical adjustment of the baffles. Plates 29 and 29′ are attached to a pair of opposite support members 30 and 30′, respectively, which support members are in turn respectively secured by means of bolts 31 to opposite sides of bracket portions 32 and 17.

Positioned in the space between and parallel to the adjacent longitudinal edges of baffles 23 and 25 (see Figs. 2, 4, 8 and 9) is a buoyant paddle 35 of low mass in the aforementioned liquid, the paddle extending diametrically of the cylindrical container. The paddle is generally in the form of an elongated hollow member with the ends sealed. The paddle of the instant embodiment is shown as being formed of two aligned hollow cylinders 36 with their outer ends sealed by threaded caps 37. The inner adjacent ends of reduced diameter of cylinders 36 are each threaded as at 37′ into opposite ends of a central hollow oblong paddle mount 38′. However, a paddle of any structural shape or configuration may be employed according to the invention, so long as the weight of the paddle in the liquid is maintained small according to the invention. Theoretically, it is not necessary for the paddle to have any apparent weight when submerged in the liquid; i.e., it may be completely buoyant; all that is required is that it be structurally rigid. The paddle may be constructed of any material conferring the foregoing mass characteristics on the paddle, such as magnesium, aluminum, plastic and the like. The reason for this is that the liquid mass, as will be more clearly seen hereinafter, serves as the rotor.

The outer edges of the paddle 35 may touch the adjacent wall sections 15 and 15′ so long as the paddle is free to rotate over the wall. However, this will reduce the revolution of the instrument, and it will not respond to as low values of acceleration change as when such end gaps are provided. In the preferred embodiment of my invention both ends 37 of the paddle are spaced from the wall sections 15 and 15′ to give orifices 38.

Although some damping is obtained by reason of the orifices 38 between the ends of the paddle and the adjacent wall sections of the container, as described above, an additional damping effect is obtained according to the instant improvements by reason of the parallel slots 40 formed between the paddle and the adjacent edges of baffles 23 and 25. The slots may be termed peripheral orifices since they are positioned adjacent the periphery of the paddle.

The total area of the gap at orifices 38 is such a small fraction of the areas of the other orifices and the flow through orifice 38 is such a small fraction of the flow through the remaining orifices that its effect on the damping ratio and on the droop may be ignored. The gap 38 need not meet the requirements of the critical value of "$d$" provided that the area of the gap 38 is held to such low value as to effect in unsubstantial degree the total flow resistance "$r$" (Eq. 1). The spacing between the buoyant paddle and the two stationary baffles is important because as these gaps are increased in area, the damping ratio at any given temperature for any given oil in the instrument will increase in value. Additional slots 40a, 40b, 40′a and 40′b are provided in baffles 23 and 25, and which preferably extend substantially the full paddle length and the length of the baffle, to permit substantially the same flow pattern as through the peripheral orifices. The auxiliary orifices are thus positioned substantially geometrically as well as hydraulically parallel to the peripheral orifices and are each substantially of the length of the peripheral orifice. They provide for flow in parallel to the flow through the slots 40. The flow through slots on one side of the center of rotation of the paddle are in series with the slots on the other side of the center of rotation, all slots on the same side of center of rotation being in parallel, i.e., so arranged as to permit parallel flow of liquid through the slots on the same side. The term parallel orifices as used in this specification is to be understood to refer to the flow pattern of the liquid.

The paddle 35 is mounted on a leaf spring type Cardan suspension so as to pivot on the central axis of the container 1. The pivoted mounting shown in Fig. 1 consists of angularly placed lugs 45 mounted on bracket 32 by means of bolts 16 and 16′. Secured to the angular lugs by means of clamps 46 (see Fig. 6) and bolts 47 passing through them is a V-shaped spring 48 (see Fig. 7) having a planar base 49, the angles formed by the legs 50 of the V and the base being equal. The base of the spring is connected by a screw 51 to the central hub 52 of the paddle 35 so as to put the axis of the paddle on a line passing through the diameter of the cylindrical container. The paddle 35 can thus pivot about the central axis of the container on the spring 48. The angular motion of the paddle is limited by means of two limit motion stop screws 53 which may be adjusted on the lugs 45.

The hub 52 of the paddle has a symmetrical boss 52' on opposite sides of the hub, and a screw 51' of the same weight and contour as screw 51 is fastened to the opposite side of the hub. This hub structure makes the paddle completely symmetrical, that is, the paddle is completely balanced in weight and is symmetrical in form about a longitudinal axis through the central axis of the cylindrical paddle and also about an axis perpendicular thereto and passing through the paddle pivot point 35' which is substantially at the intersection of the legs 50 of spring 48. While the paddle is substantially completely balanced in the embodiment shown, if desired, an additional spring such as 48 may be connected to the hub 52 of the paddle directly opposite and in the same manner as spring 48, and suspended in a similar manner with the legs of the additional spring secured to lugs 84 on bracket 17.

Connected to opposite ends respectively of brackets 17 and 32 by means of screws 55 is a pair of blocks 56 and 57. Blocks 56 and 57 have longitudinally extending brackets 56' and 57' integrally connected to the lower portions thereof, these brackets resting on and being secured to the square bracket 17' by means of screws 58. Block 56 carries two sets of pins, one set being positioned adjacent the other. One set of such pins consists of three pins 60, 61 and 62, pin 61 being positioned between but farther from paddle 35 than pins 60 and 62. The other set of pins also consists of three pins 63, 64 and 65 located with respect to each other similarly to pins 60, 61 and 62, intermediate pin 64 being positioned directly opposite intermediate pin 61, i.e., on a line parallel to the axis of paddle 35. Block 57 also carries two adjacent sets of pins, one set being composed of three pins, 60', 61' and 62', situated similarly to and directly opposite (i.e., on a line normal to the axis of paddle 35) pins 60, 61 and 62 on block 56, and the other set consisting of pins 63', 64' and 65' located similarly to and directly opposite pins 63, 64 and 65 on block 56. Positioned on a lug 38" formed on paddle mount 38' (see Fig. 9) in a plane normal to the axis of the paddle and passing through pins 61 and 61' is a pin 70, and also located on lug 38"a on the paddle mount in a plane normal to the axis of the paddle and passing through pins 64 and 64' is a pin 71.

A strain sensitive wire 72 is wound in tension between pins 61 and 70 in a loop, one end of the loop terminating at pin 60 and the other end terminating at pin 62. A strain wire 72' is also wound in tension between pins 61' and 70 in a loop, one end of the loop terminating at pin 60' and the other end terminating at pin 62'. In the same manner a strain wire 73 is wound in tension in a loop between pins 64 and 71, the opposite ends of the wire terminating at pins 63 and 65; and a strain wire 73' is wound in tension in a loop between pins 64' and 71, the opposite ends of the wire terminating at pins 63' and 65'. All the pins are electrically insulated and the wires are out of contact with the frame and with each other. The ends of each of the four wires 72, 73, 72' and 73' are respectively connected by conductors such as 90 to four pairs of terminals 75, 76, 77 and 78 located in blocks 56 and 57, which terminals in turn are connected by conductors (not shown) to terminals 79 (see Fig. 3) extending through bottom 2 of the device. The latter terminals are connected in a conventional Wheatstone bridge arrangement to the four outer terminals 80 located on the periphery of flange 4.

It will be seen that angular motion of the paddle 35, e.g., in a clockwise direction as viewed in Fig. 1, will cause pin 70 to move toward block 56 and away from block 57, and will cause pin 71 to move toward block 57 and away from block 56. This action relaxes the tension in wires 72 and 73', and increases the tension in wires 72' and 73, since the pins on blocks 56 and 57 are stationary. If the mass of liquid in the container causes the paddle to move counterclockwise, wires 72 and 73' are increasingly tensioned and the tension in wires 72' and 73 is relaxed. Suitable motion limiting stop screws 83 pass through lugs 84 secured to the bracket 17 by screws 16 and 16'.

The case or container 1 may be completely filled with liquid through a fill hole stoppered by a screw 85 (see Fig. 5) and the fluid enters and fills the chamber 86 between the bottom and top members 2 and 3 of the device, and passes into and fills the chamber 87 underneath the diaphragm 14 through ports 88. Suitable air breather holes 89 are provided in the flange 13.

Instead of using slots 40a, 40b, 40'a and 40'b I may use holes or employ a wire screen insert in the baffles. In each case the upper limit of the size of the slots and the holes or screen openings are determined by the considerations previously referred to. There is in this case also an upper limit to the size of the holes. The maximum value of the hole opening depends on the shape of the hole and this maximum value is not necessarily the same as for the slots and as described above.

The flow path of the liquid on, for example, angular acceleration of the case, is shown by arrows A, by arrows B and C along the paddle, and returning in the subchambers D and E, as shown. A parallel flow occurs through the paddle gaps 38 and 40 and orifices 40a, 40b, 40'a and 40'b in the direction of the arrows F and G. The flow along F and G is thus parallel to the flow in the directions B and C.

Illustrative of the effect of adding slots to the baffles are the results obtained in the following examples, which results are charted in Figs. 10 and 11.

*Example 1*

An accelerometer similar in design to that shown in Figs. 1 to 9 inclusive, but without slots 40a, 40b, 40'a and 40'b, was filled with an oil having the following approximate characteristics:

| | °F. |
|---|---|
| Viscosity of 2500 centistokes at | −40 |
| Viscosity of 1300 centistokes at | 0 |
| Viscosity of 500 centistokes at | 75 |
| Viscosity of 230 centistokes at | 150 |
| Viscosity of 150 centistokes at | 200 |

The length of the paddles 36 was each 1.499 inches and the paddle diameter was 0.410 inches. The end gaps were approximately 0.040 and 0.045 inch each. The width of the gaps 40 on each side of each paddle was 0.062 inch. No slots 40a, 40b, 40'a or 40'b were used. The instrument was tested to obtain the damping ratio and its natural frequency at the following temperatures with the following results:

| Temp. of Test, °F. | Damping Ratio, Fraction of Critical Damping | Natural frequency, cycles/sec. |
|---|---|---|
| 0 | .65 | 10.5 |
| 76 | .4 | 11.6 |
| 156 | .32 | 12.2 |
| 205 | .32 | 12.8 |

The damping ratio as a function of the viscosity of the oil present at the temperature of test as determined by graphical interpolation from the above data is plotted in Fig. 10 on a semi-logarithmic scale (see curve 1).

Figure 11:
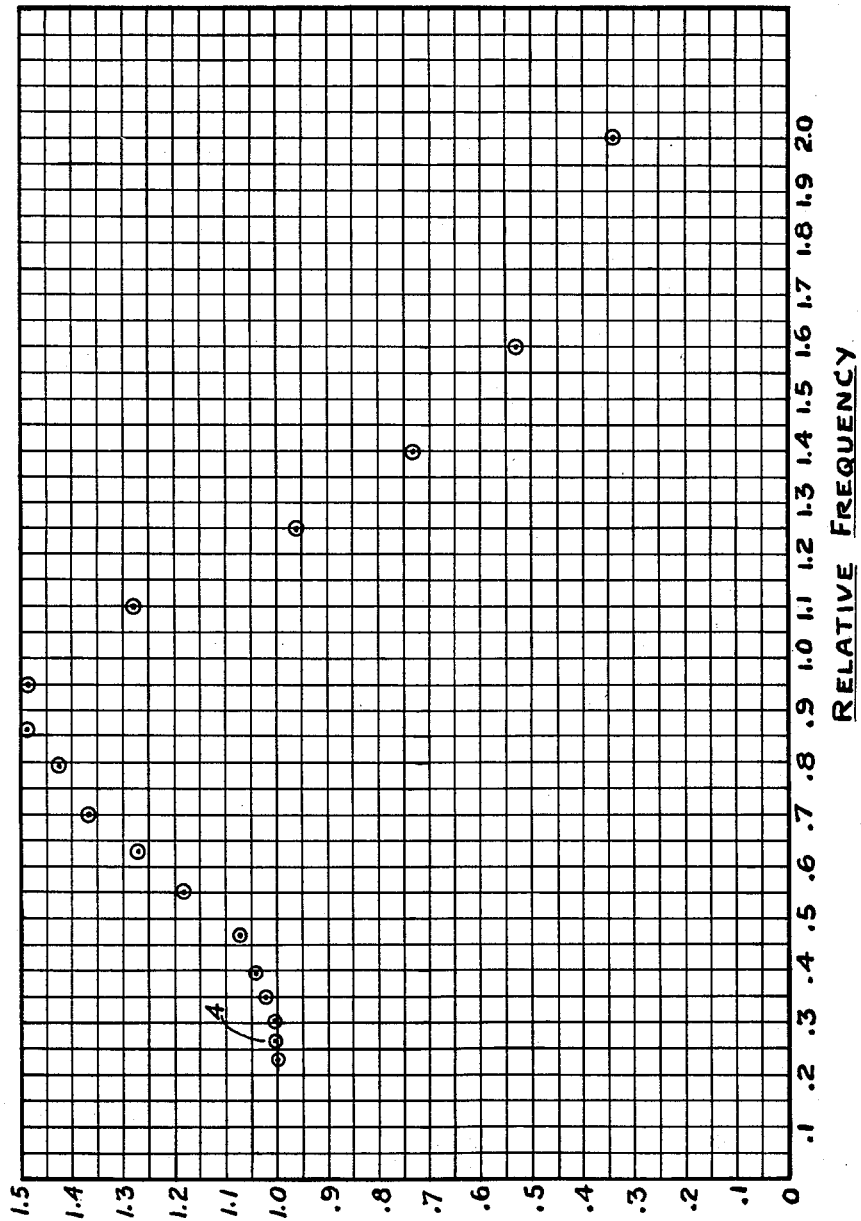

The frequency response of the instrument was also determined and the frequency response curve as determined at 205° F. is given as curve 4 of Fig. 11. On the ordinate is plotted the relative amplitude, i.e. ratio of the observed amplitude, of the excursion of the paddle at the applied frequency and with constant angular acceleration, to the amplitude at zero frequency obtained by extrapolation of the observed amplitudes at various applied frequencies and constant angular acceleration. On the abscissa is plotted the relative frequency i.e. the ratio of the applied frequency to the natural frequency under constant angular acceleration.

It will be observed that the damping ratio passes through a minimum of about .31 at a viscosity of about 150 to 200 centistokes equivalent to about 150 to 200° F. The frequency response curve is characteristic of such under-damped systems.

*Example 2*

This example illustrates the effect of increasing the paddle gaps without any other structural change in the unit of Example 1. The gaps 40 were increased from 0.062 inch to 0.105 inch. The unit was tested as previously. The following results were obtained:

| Temp. of Test, ° F. | Damping Ratio, Fraction of Critical | Frequency, Cycles/sec. |
|---|---|---|
| −50 | 1.2 | 9.8 |
| 0 | .7 | 9.7 |
| 75 | .5 | 10.5 |
| 150 | .52 | 12 |
| 200 | .6 | 13.25 |

On Fig. 10, curve 2 is plotted the damping ratio against the viscosity of the oil, equivalent to the temperatures at which the tests were made, as obtained in the manner described in the previous example.

On Fig. 12, curve 5 is plotted the relative amplitude as a function of the relative frequency determined at a temperature of 200° F. in a manner similar to curve 4 of Fig. 11 of the previous example.

It will be observed that the minimum damping ratio has been raised to about .5 in the region of a minimum viscosity of about 300 to 500 centistokes or in the region of about 75 to 100° F. (Ssee Fig. 10, curve 2.) The frequency response curve Fig. 12, curve 5, shows a drooping response curve with the relative amplitude being less at relative frequencies above .4 of the natural frequency than is to be expected of an instrument of constant mass, stiffness and damping.

*Example 3*

The instrument of Example 1 was modified to provide slots 40a, 40b, 40'a, 40'b. Slots 40a and 40'a were each 1.26 inches long and 0.062 inch wide with end radius of .03 inch. The slots 40b and 40'b were 1.275 inches long, and 0.062 inch wide with end radius of 0.03 inch.

The unit was tested as in the previous examples with the following results:

| Temp. of Test, ° F. | Damping Ratio, Fraction of Critical Damping | Natural Frequency |
|---|---|---|
| −40 | 1.0 | 9.95 |
| 0 | .65 | 10.3 |
| 78 | .5 | 12.3 |
| 155 | .5 | 11.25 |
| 205 | .6 | 13.2 |

Curve 3 gives the damping ratio as a function of viscosity. It will be observed that the damping ratio is substantially the same as in Example 2 with the viscosity range somewhat broadened.

Curve 6 of Fig. 12 gives the frequency response curve of this instrument tested at a temperature of 209° F. and plotted in the same manner as curves 4 and 5. It will be observed that the droop of curve 5 has largely been removed, holding the relative response between .97 to 1 up to .9 of the natural frequency whereas in the case of curve 5 the relative response falls steadily with increasing relative frequency.

The slots have not only improved the damping ratio as did the increase in the paddle gap but they have also improved the frequency response of the instrument.

As will be seen from the foregoing, the effects described above may be produced by altering the dimensions and number of the gaps. They may also be influenced by changing the fluid which may result in a change in the value of $k$ and its temperature dependance. By suitable choice of the liquid so that it has the desirable viscosity and by suitable design of the slots as indicated so that the values of $d^2$ are less than $$\frac{1}{2}\frac{k}{f_n}$$

the desirable results of my invention may be attained.

While I have described a particular embodiment of my invention for the purpose of illustration, it should be understood that various modifications and adaptations thereof may be made within the spirit of the invention as set forth in the appended claims.

I claim:

1. An accelerometer comprising a case, a barrier wall in said case, a liquid in said case, on both sides of said barrier wall, an orifice having a peripheral edge, said orifice being positioned in said barrier wall, a paddle in said orifice spaced from the peripheral edge of said orifice to form a peripheral orifice, a second orifice spaced from said peripheral orifice in parallel with said first orifice, both orifices being in parallel to the flow of the liquid in said case, the width in centimeters of each of said orifices measured in a direction perpendicular to the direction of flow through said orifices being less than $$\sqrt{\frac{k}{2f_n}}$$

where $k$ is a kinematic viscosity of the liquid in stokes and $f_n$ is the natural frequency of the accelerometer, in cycles per second measured at the temperature at which said kinematic viscosity is measured.

2. An accelerometer, comprising a closed cylindrical chamber, said chamber having opposing cylindrical portions, liquid in said chamber, a paddle, a hinge for said paddle, said hinge connected to said paddle, a mounting in said chamber for said hinge, said paddle being rotatably mounted about said hinge for limited angular motion of said paddle, at least one edge of said paddle being closely spaced from the adjacent cylindrical wall of the container, baffles disposed closely adjacent the longitudinal edges of said paddle to form peripheral orifices, a plurality of auxiliary orifices in said chamber parallel to said peripheral orifice, said liquid circulating in parallel through said orifices in a direction of flow parallel to the direction of flow of the liquid in said chamber, each of said orifices having a width in centimeters measured in a direction perpendicular to the direction of flow through said orifices which is less than $$\sqrt{\frac{k}{2f_n}}$$

where $k$ is the kinematic viscosity of the liquid in stokes and $f_n$ is the natural frequency of the accelerometer, measured in cycles per second at the temperature at which said viscosity is measured.

3. An accelerometer, comprising a closed cylindrical chamber, said chamber having opposing cylindrical wall portions, liquid in said chamber, a paddle, a hinge for said paddle, said hinge connected to said paddle, a mounting in said chamber for said hinge, said paddle being rotatably mounted about said hinge for limited angular motion of said paddle, at least one edge of said paddle being closely spaced from the adjacent cylindrical wall of the container, baffles disposed closely adjacent the longitudinal edges of said paddle to form peripheral orifices, auxiliary orifices in said baffle disposed adjacent to said peripheral orifices, said liquid circulating in parallel through said orifices in a direction of flow parallel to the direction of flow of the liquid in said chamber, each of said orifices having a width in centimeters measured in a direction perpendicular to the direction of flow through said orifices which is less than $$\sqrt{\frac{k}{2f_n}}$$

where $k$ is the kinematic viscosity of the liquid in stokes and $f_n$ is the natural frequency of the accelerometer, in cycles per second measured at the temperature at which said viscosity is measured and motion sensing means connected to said paddle to sense the angular displacement of said paddle.

4. An accelerometer, comprising a closed chamber, said chamber having opposing cylindrical walls, liquid in said chamber, a rigid buoyant paddle of low mass, said paddle having a low weight when immersed in said liquid, a spring hinge for said paddle, said spring hinge being connected to said paddle, a paddle mounting in said chamber positioned on said hinge, said paddle being rotatably mounted about said spring hinge on the axis of said cylinder for limited angular motion of said paddle about the said axis, said paddle extending from one wall to the opposing wall and immersed in said liquid, opposing edges of said paddle being positioned adjacent the opposing cylindrical walls, a pair of baffles, one fixedly mounted above and the other fixedly mounted below said paddle, said baffles being disposed parallel to the axis of said paddle and spaced closely adjacent thereto, said baffles being substantially co-extensive with said paddle, a plurality of parallel orifices in said baffles, said liquid circulating in parallel through said orifices in a direction of flow parallel to the direction of flow of the liquid in said chamber, each of said orifices having a width in centimeters measured in a direction perpendicular to the direction of flow through said orifices which is less than $$\sqrt{\frac{k}{2f_n}}$$

where $k$ is the kinematic viscosity of the liquid in stokes and $f_n$ is the natural frequency of the accelerometer, in cycles per second measured at the temperature at which said viscosity is measured and motion sensing means connected to said paddle to sense the angular displacement of said paddle.

5. An accelerometer comprising a case, a yieldable constraint connected to said case, a member mounted in said case and connected to said constraint, said member having edges spaced from the case to provide liquid passageways therebetween, a second passageway in said case from one side of said member to another side of said member, liquid in said case and in said passageways, said member being immersed in said liquid, whereby on motion of said member said liquid is displaced relative to said passageways, the dimension of each of said passageways measured in centimeters in a direction transverse to the direction of relative motion of said liquid and said passageways, being less than $$\sqrt{\frac{k}{2f_n}}.$$

where $k$ is the kinematic viscosity measured in stokes and $f_n$ is the natural frequency of the accelerometer measured in cycles per second at the temperature at which said kinematic viscosity is taken and means responsive to the motion of said member.

6. In the accelerometer of claim 5 in which the member is mounted for limited angular movement on said constraint.

7. In the accelerometer of claim 5 in which the second passageway is positioned relative to the first mentioned passageway for parallel movement of liquid relative to the said passageways.

8. In the accelerometer of claim 7 in which the member is mounted for limited angular movement on said constraint.

References Cited in the file of this patent
UNITED STATES PATENTS

| | | |
|---|---|---|
| 767,372 | Arcioni | Aug. 16, 1904 |
| 2,332,994 | Draper et al. | Oct. 26, 1943 |
| 2,776,829 | Cockram | Jan. 8, 1957 |
| 2,778,624 | Statham | Jan. 22, 1957 |